C. W. STEVENS
VALVE MECHANISM
Nov. 3, 1931.
Re. 18,244
Original Filed Nov. 27, 1926
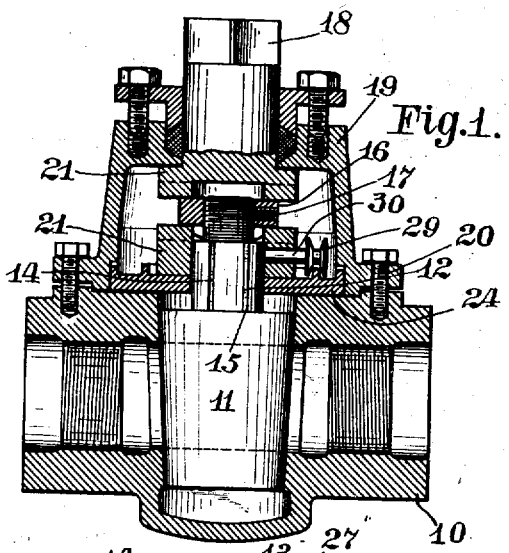
Fig.1.
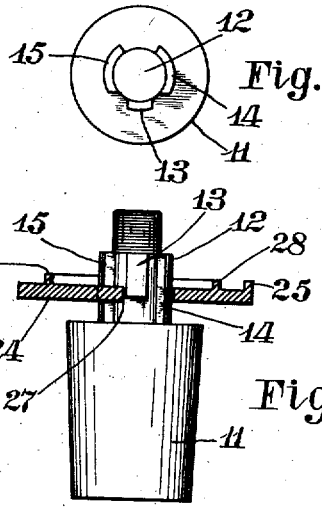
Fig.3.
Fig.2.
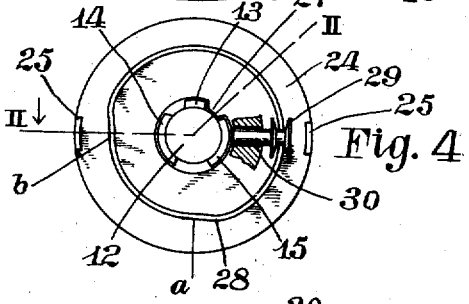
Fig. 4
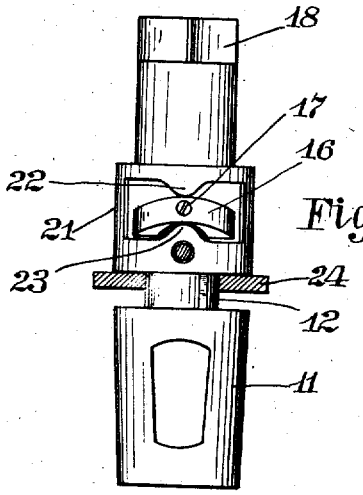
Fig. 6.
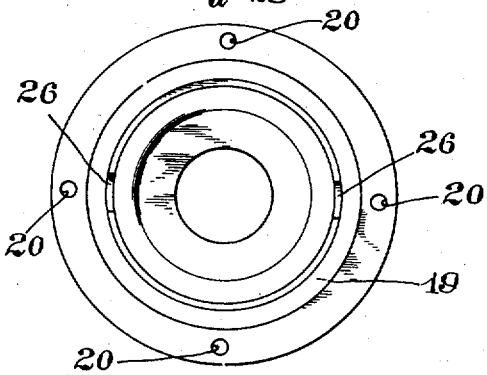
Fig.5.
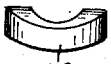
Fig.7.
Inventor
CHARLES W. STEVENS
by Finnegan Finnegan
his Attorneys Reissued Nov. 3, 1931

Re. 18,244

UNITED STATES PATENT OFFICE

CHARLES W. STEVENS, OF COLUMBUS, OHIO

VALVE MECHANISM

Original No. 1,715,176, dated May 28, 1929, Serial No. 151,202, filed November 27, 1926. Application for reissue filed May 6, 1930. Serial No. 450,267.

The object of this invention is to provide an improved valve adapted to various uses, especially in those places where a tight fit is desired and the plug is likely to stick. An important feature of the invention is that the plug is raised and lowered in a right line with respect to its seat by the same device that is used to turn it.

The invention is embodied in the example herein shown and described, the features of novelty being finally claimed.

In the accompanying drawings—

Figure 1 is mainly a vertical section with some parts in full showing a valve according to the invention.

Fig. 2 is a side view of the plug with a cam plate thereon in section on the line 11—11 Fig. 4.

Fig. 3 is a plan view of the upper end of the plug with the cam plate removed.

Fig. 4 is a plan view of the upper end of the plug with the cam plate thereon and a portion in section.

Fig. 5 is a plan view of the lower side of the housing.

Fig. 6 is a view in side elevation of the plug-operating stem and the plug assembled.

Fig. 7 is an edge view of the raising and lowering cam.

In the views 10 designates a valve body or casing containing the valve seat. 11 designates the valve or plug which has a stem 12 with a narrow longitudinal lug 13 thereon spaced at its lower end from the top of the plug, and two wide longitudinal lugs 14 and 15 that extend to the top of the plug. The upper end of the stem of the plug is threaded to receive a curved cam 16 that has two low points and two high points said cam being fixed in position on said thread by a set screw 17 (see Fig. 1). 18 designates the plug operating stem adapted to be turned with a wrench in a housing 19 fixed to the top of the casing by means of cap screws passed through holes 20 in a flange of the housing. The lower portion of the stem is in the form of a cage 21 having upper and lower lugs 22 and 23 at opposite sides thereof adapted to operate on the cam 16 when the stem 18 is turned. The upper end of the cage 21 forms a shoulder having a bearing to prevent the stem and cage from moving upward while the lower end of the cage turns on a cam plate 24. The cam plate 24 is seated on the top of the valve body casing and has two lugs 25, 25, that engage recesses 26, 26, in the housing so that when the housing is secured to the casing the cam plate is locked in fixed position. The cam plate is centrally pierced to encircle the stem of the plug and lugs thereon but has an internal lug 27 to function as hereinafter explained. The cam plate 24 has a track cam 28 having its major portion, as between the points *a*—*b*, at one side concentric with the axis of the cam plate and the stem of the plug while the smaller opposite portion thereof between said points *a*—*b* is deflected inward or inset with respect to the axis of the plate as shown. 29 designates a grooved wheel travelling on the cam track said grooved wheel having fixed thereon a horizontal axle 30 fitting in a horizontal hole in the lower wall of the cage. When the cage is rotated on the stem of the plug the cam track causes the axle 30 to reciprocate in its bearing, and when the grooved roller arrives at the inwardly deflected portion of the cam track the end of the axle is projected beyond the inner side of the wall of the lower end of the cage. When so projected the inner end of the axle serves as a lug to engage one or the other of the wide lugs 14 or 15 according to the direction the cage is turned.

The operation is this: Assuming that the valve is in seated open position and it is desired to close the valve, the plug operating stem is turned in clockwise direction, the lugs 22 and 23 passing along the cam 16 force the plug upward to raised position without turning the plug because the lug 27 is engaged with narrow lug 13. At the point *a* on the track-cam the plug is in its highest position and upon continued rotation of the cage allowing the lug 13 to pass over internal lug 27. At the point *a* on the track cam wheel 29, with its axle, starts inward into position to engage lug 14 this connecting cage 21 with the plug. Through the inset portion of the track cam *a*—*b* the plug is turned to its closing position but still elevated. At point *b* the track-cam draws the wheel 29, with its axle outward thus disengaging the cage 21 from the plug. At this position lug 14 is against internal lug 27 thereby preventing the plug from turning farther. The plug operating stem is further turned in the clockwise direction thereby causing the lugs 22 and 23 of the cage 21 to ride on cam 16 thereby forcing the plug down into its seat in closed position. To turn the plug to open position again the operation is reversed but in this operation the projected axle of wheel 29 engages the stem lug 15, and the said lug 15 stops against internal lug 27.

The forms of the parts can be changed without departing from the gist of the invention as claimed.

What I claim is:

1. In a valve mechanism, a casing having a plug seat, a plug therefor adapted to be raised from and lowered to either of two different positions in said seat, said plug having a stem provided with a longitudinal lug spaced at its lower end from the top of the plug and flanking lugs longitudinally spaced from the first mentioned lug extending below said longitudinal lug, thereby forming a U-shaped recess and a longitudinal recess opposite said longitudinal lug, a cam member secured to the upper end of said stem, a stationary plate on said casing having a cam track and a lug entering said U-shaped recess to positively lock the plug from rotation in either of its lowered positions and release the same for rotation in its raised position, a rotary plug-operating member journaled above the casing and carrying a sliding pin actuated by said cam track to project said pin into said longitudinal recess to cause the rotation of the plug when the plug is raised from its seat, said plug operating member also carrying lugs to act on said cam member of the stem to raise and lower the plug.

2. In a valve plug mechanism, a casing having a plug seat, a plug therefor adapted to be moved in an axial direction from and to either of two positions with respect to said seat, a rotatable plug operating stem and means thereon consisting of a cam for moving the plug in an axial direction to and from said seat and means for restraining the plug from rotary motion while it is being moved axially.

3. In a valve plug mechanism, a casing having a plug seat, a plug therefor adapted to be moved in an axial direction from and to either of two positions with respect to said seat, a rotatable plug operating stem and means thereon for moving the plug in an axial direction to and from said seat by rotation of the plug operating stem in one direction and means for restraining the plug from rotary motion while it is being moved axially 4. In a valve plug mechanism, a casing having a plug seat, a plug therefor adapted to be moved in an axial direction from and to either of two positions with respect to said seat, a single rotatable plug operating device having means thereon for moving the plug in an axial direction and means actuated by said plug operating device for restraining the plug from rotary motion while it is being moved axially.

5. In a valve plug mechanism, a casing having a plug seat, a plug therefor adapted to be moved in an axial direction from and to either of two positions with respect to said seat, a rotatable plug operating stem and means thereon consisting of a cam for moving the plug in an axial direction to and from said seat, means for restraining the plug from rotary motion while being moved axially, and means for rotating said plug including a pin actuated by said rotatable plug operating stem and a stationary cam engaging said pin.

CHARLES W. STEVENS.